No. 723,767. PATENTED MAR. 24, 1903.
P. WHITING.
HOSE COUPLING.
APPLICATION FILED SEPT. 12, 1900. RENEWED JAN. 28, 1903.
NO MODEL. 2 SHEETS—SHEET 1.
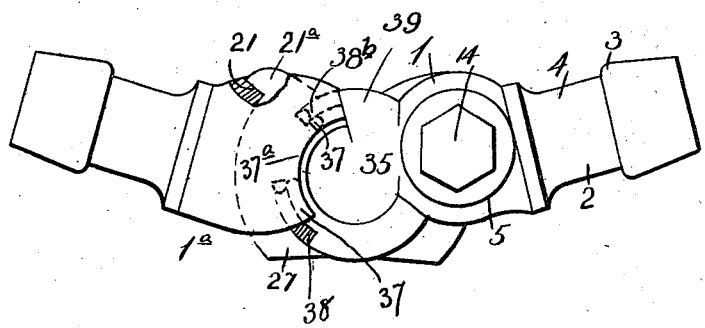
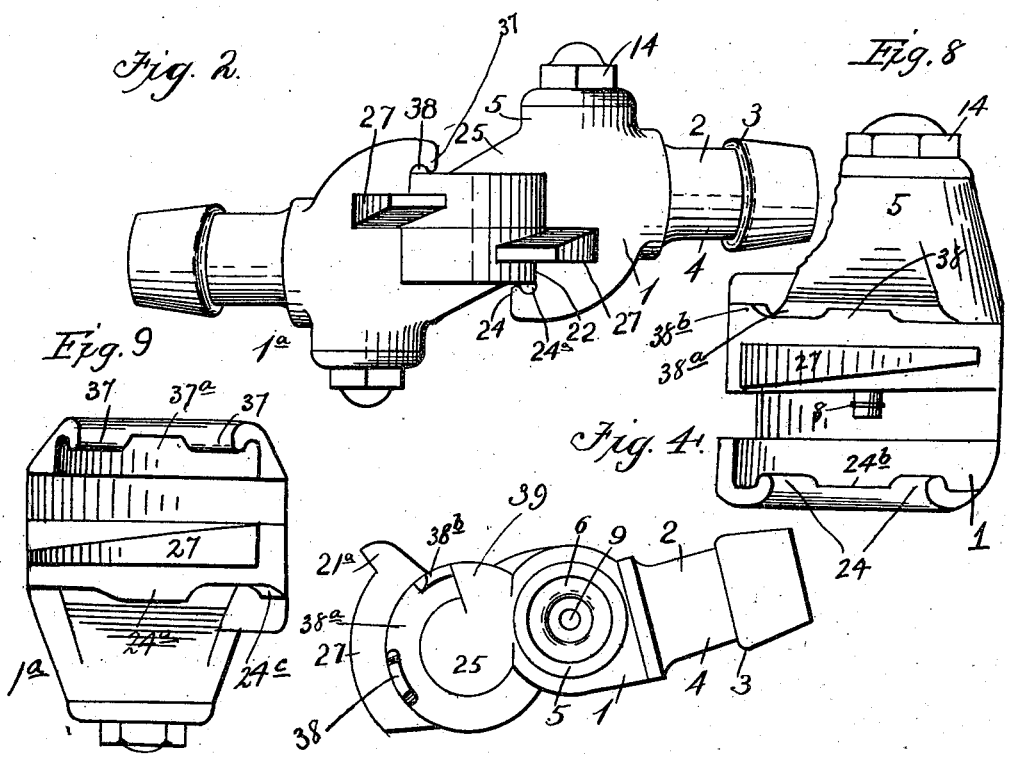
Witnesses:
F. L. Ourand
E. P. Bonyer
Inventor:
Paul Whiting,
By Louis Bagger & Co.,
Attorneys.

No. 723,767. PATENTED MAR. 24, 1903.
P. WHITING.
HOSE COUPLING.
APPLICATION FILED SEPT. 12, 1900. RENEWED JAN. 28, 1903.
NO MODEL. 2 SHEETS—SHEET 2.
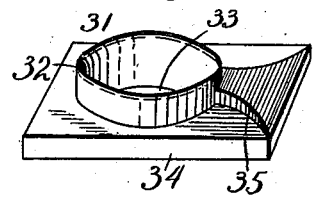
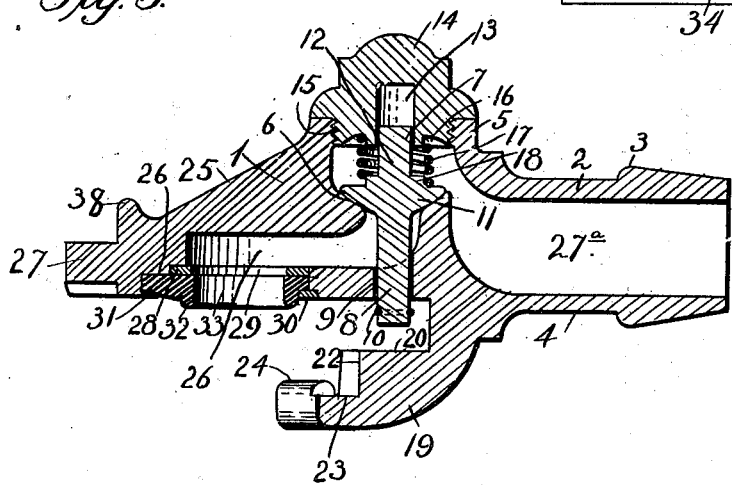
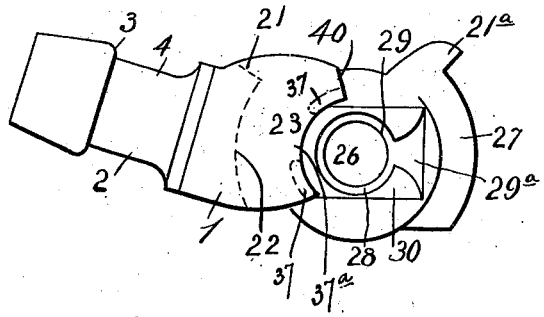
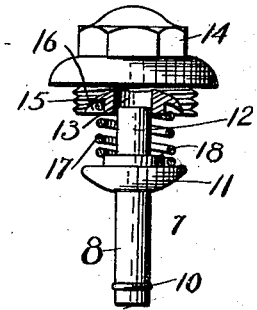
Witnesses:
F. L. Durand
E. P. Bannyen
Inventor:
Paul Whiting,
By Louis Bagger & Co.,
Attorneys.

UNITED STATES PATENT OFFICE.

PAUL WHITING, OF EAST LAS VEGAS, TERRITORY OF NEW MEXICO.

HOSE-COUPLING.

SPECIFICATION forming part of Letters Patent No. 723,767, dated March 24, 1903.

Application filed September 12, 1900. Renewed January 28, 1903. Serial No. 140,957. (No model.)

*To all whom it may concern:*

Be it known that I, PAUL WHITING, a citizen of the United States, residing at East Las Vegas, in the county of San Miguel and Territory of New Mexico, have invented new and useful Improvements in Hose-Couplings, of which the following is a specification.

My invention relates to hose-couplings designed more particularly for use in coupling the short sections of hose between cars in air-brake systems; and the objects of the same are to provide a simple and reliable coupling for this purpose which will form a perfectly-tight joint when coupled and which will automatically uncouple and close a valve in each section of the coupler when the cars separate. I attain these objects by means of the construction shown in the accompanying drawings, in which—

Figure 1 is a side view of the coupling as a whole. Fig. 2 is a plan view of the same. Fig. 3 is a sectional view of one member of the same. Fig. 4 is a side view of one of the members. Fig. 5 is a similar view of the reverse side of said member. Fig. 6 is a perspective view of the rubber gasket. Fig. 7 is an elevation and partial section of one of the valves. Fig. 8 is a front elevation of one member of the coupling with parts broken away. Fig. 9 is a front elevation of the other members of the coupling.

Like numerals designate like parts wherever they occur in the different views.

In said drawings the numerals 1 $1^a$ designate the two members of my coupling, and as these two members are substantially identical in construction only one of them will be described. The member 1 of the coupling comprises the tubular end portion 2, which is tapered, as shown, and is provided with the annular bead or enlargement 3 and the reduced portion 4 for the attachment of one end of a hose, as will be readily understood. A hollow boss 5 extends up from one side of the member 1, and within said boss are a valve-seat 6 and a spring-seated valve 7. This valve consists of a round stem 8, which passes through an aperture 9 in the coupling member and is provided with a packing-ring 10, surrounding it near its outer end, forming an air-tight joint in the aperture 9. More than one such packing-rings may be used, if found desirable. The valve-head 11 is in the form of an enlargement on the stem 8 intermediate its ends, and the upper end 12 of the stem projects into a recess 13, formed in a cap-nut 14, attached by a threaded connection 15 inside the boss 5. This cap-nut is provided with a recess 16, surrounding its inner end to form a seat for a spiral spring 17, the opposite end of said spring bearing upon a shoulder 18, formed on the upper surface of the valve-head 11. An undercut segmental flange 19 is formed on the member 1, and this flange has a ledge 20, which faces the projecting end of the valve-stem 8. A recess 21 is formed at one side of said ledge to serve as a stop for a lug $21^a$, formed on the member $1^a$. A curved wall 22 is formed on the flange 19, and a curved ledge 23 projects outward from the outer edge of the wall 22. A turned-up lip 24 is formed on this member of the coupling, which lip is interrupted or recessed at $24^b$ to provide a passage for an overhanging lip $24^a$ of equal width. The lip $24^a$ normally engages the lip 24, but traverses the passage $24^b$ in the act of uncoupling. A lug $24^c$, also formed on the member, acts in combination with the lip $24^a$ to engage the lip 24 and secure the coupling. Extending outward from the boss 5 in a plane parallel to the flange 19 is a head 25, provided with a gasket-socket 26 and a transversely-tapered tongue 27. The gasket-socket consists of the inner recess 26, which communicates with the bore $27^a$ of the member 1, and a superposed plate 28, having an aperture 29 therein of a size somewhat smaller than the recess 26. Lying parallel with the plate 28 is a rim 30, having a keyhole-slot $29^a$ therein of larger dimensions than the aperture 29 in the plate 28. The space between the plate 28 and the rim 30 forms a seat for a rubber gasket 31, Fig. 3. This gasket has a central apertured boss 32 and an inclined portion 35 thereon, which incline tapers from the edge of the boss to an edge. The gasket is seated between the plate 28 and rim 30, with the inclined portion outward. By this arrangement the two members of the coupling may be easily slipped together by placing the inclined portions 35 opposite each other, when they will act as guides and keep the bosses 32 from preventing the engagement. Upon the upper surface of the head 25 is formed an upturned lip 38, which is designed to engage an interrupted or recessed overhanging lip 37, similar in every respect to the lip 24 and having a recess 37ª therein. This recess serves as a passage for the lip 38 in the act of uncoupling. A lug 38ᵇ, similar to 24ᶜ, also engages the lip 37 when coupled, but is disengaged by the straightening out of the members in uncoupling. A stop 39 is formed at one end of the groove 36 for the projection 40 on the member 1ª.

The members 1 and 1ª are substantially identical in construction, and when it is desired to couple these two parts together the transversely-tapered tongue 27 is inserted between the flange 19 and the head 25, so that when the tongue is turned toward its thicker end it bears upon the projecting end of the valve-stem 8, and when the two members are coupled they occupy the relative position shown in Fig. 1, the valve being open and communication established through the coupling. Should the train part or should the cars be uncoupled, the two members of my hose-coupling would straighten out, thus bringing one lip opposite the recess in the companion lip on the other member, the lip 38 would traverse the passage 37ª and the lip 24ª the passage 24ᵇ, the lugs 24ᶜ and 38ᵇ would be disengaged, the two members would pull apart, and the springs 17 would simultaneously seat the valve 7, thereby cutting off the air in each section.

From the foregoing it will be obvious that my coupling is simple in construction, reliable and effective, and will automatically uncouple and close the valves when the cars are separated.

Having thus fully described my invention, what I claim is—

1. A hose-coupling composed of two interlocking members each having a spring-seated valve therein, a valve-stem extending out through the wall of each member, the opposite end of the stem projecting into a recess in a cap-nut, a tapered tongue to force the extended end of the valve-stem inward to open the valve, and superposed gaskets in the members, substantially as described.

2. In a hose-coupling, two members each having a first recessed or interrupted lip thereon, and a second lip, the said first lip on one member being located to engage the said second lip on the other member, said lips being so disposed when coupled that the straightening out of the coupling will cause the said second lip to pull through the interrupted space in said first lip and be disengaged therefrom, and a stop to limit the rotation of said members.

3. The combination, substantially as described, with a member of a hose-coupling, of a gasket, comprising a hollow boss rising from a base, and an inclined portion on said base adjacent to said boss and sloping from the same.

4. In a hose-coupling, the combination substantially as described, of a first member having a recessed or interrupted lip thereon, a second member having a lip thereon located to engage the said interrupted lip when coupled and to pull through the said recess in the act of uncoupling.

In testimony whereof I have hereunto set my hand in presence of two subscribing witnesses.

PAUL WHITING.

Witnesses:
CHAS. F. MILLER,
W. B. BUNKER.